United States Patent [19]

Vogt-Birnbrich et al.

[11] Patent Number: 5,760,123

[45] Date of Patent: Jun. 2, 1998

[54] AQUEOUS DISPERSION OF POLYURETHANES CONTAINING SILOXANE LINKAGES, PRODUCTION THEREOF AND USE IN COATING COMPOSITIONS

[75] Inventors: Bettina Vogt-Birnbrich, Solingen; Hans-Peter Patzschke; Werner Lenhard, both of Wuppertal; Jurgen Döbert, Sprockhövel; Marcus Brunner, Wuppertal, all of Germany

[73] Assignee: Herberts Gesellschaft mit beschrankter Haftung, Wuppertal, Germany

[21] Appl. No.: 564,344

[22] PCT Filed: Apr. 14, 1995

[86] PCT No.: PCT/EP95/01411

§ 371 Date: Feb. 13, 1996

§ 102(e) Date: Feb. 13, 1996

[87] PCT Pub. No.: WO95/28429

PCT Pub. Date: Oct. 26, 1995

[30] Foreign Application Priority Data

Apr. 19, 1994 [DE] Germany ............... 44 13 562.9

[51] Int. Cl.⁶ ............... C08J 3/00; C08K 3/20; C08L 75/00; C08G 77/04
[52] U.S. Cl. ............... 524/500; 524/588; 524/591; 524/839; 524/840; 528/28
[58] Field of Search ............... 524/500, 588, 524/591, 839, 840; 528/28

[56] References Cited

U.S. PATENT DOCUMENTS 3,941,733   3/1976   Chang ............... 260/29.2

FOREIGN PATENT DOCUMENTS 0 163 214   12/1985   European Pat. Off. .
0 315 006    5/1989   European Pat. Off. .

*Primary Examiner*—Patrick D. Niland
*Attorney, Agent, or Firm*—Merchant, Gould, Smith, Edell Welter & Schmidt

[57] ABSTRACT

Aqueous dispersion of one or more polyurethane resins with a number average molecular weight (Mn) of 2500 to 1000000, a content of 2 to 150 mmol of siloxane linkages (—Si—O—Si—) per 100 g of solid resin, a hydroxyl value of 0 to 100 and a content of ionic groups, groups convertible into ionic groups and/or hydrophilic groups of 5 to 200 mEq per 100 g of solid resin and the process for the production thereof by chain extension of a polyurethane prepolymer containing ionic groups, groups capable of ion formation and/or hydrophilic groups which has at least one group R'OSi— in which $R'=C_1$ to $C_8$ alkyl or $C(O)R'''$ and
$R'''=C_1$ to $C_{10}$ alkyl by the addition of water. The aqueous dispersion is suitable for aqueous coating compositions which are suitable in particular for multilayer lacquer coatings.

19 Claims, No Drawings

AQUEOUS DISPERSION OF POLYURETHANES CONTAINING SILOXANE LINKAGES, PRODUCTION THEREOF AND USE IN COATING COMPOSITIONS

This invention relates to aqueous polyurethane dispersions (PU dispersions), to a process for the production thereof, to water-borne coating compositions containing the polyurethane dispersions, and to the use thereof for the production of multilayer lacquer coatings.

A multitude of differently chain-extended polyurethane dispersions has become known. Due to their outstanding properties they have in particular found industrial applications as binders in aqueous base lacquers.

Thus, for example, EP-A-0 089 497, EP-A-0 228 003, DE-A-36 28 124 and EP-A-0 512 524 describe aqueous base lacquers which contain aqueous polyurethane dispersions as the binder, which may be produced by chain extension of isocyanate-functional prepolymers with polyamine and/or polyol.

DE-A-39 15 459 provides examples of aqueous base lacquers which contain aqueous polyurethane dispersions as the binder, which may be produced by chain extension of isocyanate-functional prepolymers with water.

Examples of aqueous base lacquers based on aqueous polyurethane dispersions, which may be produced by chain extension with polyisocyanates of polyisocyanate-reactive PU prepolymers containing active hydrogen, may be found in DE-A-39 03 804 and DE-A 40 01 841.

Multilayer lacquer coatings produced using water-based lacquers formulated on the basis of known polyurethane dispersions require improvement with regard to their resistance to condensed water. If known polyurethane dispersions are used as the sole binder in aqueous effect base lacquers, the resultant effect development is less favourable in comparison with aqueous effect base lacquers containing at least one further co-binder.

EP-A-0 163 214 describes aqueous self-crosslinking polyurethane dispersions with preferably lateral siliconate groups. The PU dispersions are produced and stored under conditions which deliberately prevent the siliconate groups from reacting together. After application, the binders crosslink by condensation of the siliconate groups to form siloxane linkages.

Further aqueous solutions or dispersions of polyurethanes with reactive siliconate groups suitable for crosslinking are known from EP-A-0 315 006. The binders described therein are synthesised by the reaction of the isocyanate groups of isocyanate prepolymers with amino groups, i.e. chain extension proceeds via amino groups. A large quantity of water is added during production of the binders, such that, in accordance with the law of mass action, virtually no siloxane linkages are produced.

The object of the present invention is to provide novel aqueous polyurethane dispersions which, when used as binders in aqueous coating compositions, in particular in aqueous base lacquers, allow the production of multilayer lacquer coatings with improved condensed water resistance. When aqueous effect base lacquers are used which contain as the sole binder the PU dispersion to be provided, the resultant effect development within multilayer lacquer coatings should satisfy present requirements in automotive lacquer coating.

This object is achieved by the provision of aqueous polyurethane dispersions based on a polyurethane resin with a number average molecular weight (Mn) of 2500 to 1000000, a content of 2 to 150 mmol, preferably of 3 to 100 mmol, particularly preferably of 7 to 70 mmol of siloxane linkages (—Si—O—Si—) per 100 g of solid resin, a hydroxyl value of 0 to 100, preferably of above 1 and below 60 mg KOH/g relative to the solid resin and a content of ionic groups, groups convertible into ionic groups and/or hydrophilic groups of 5 to 200 mEq per 100 g of solid resin. The polyurethane resins according to the invention are of a linear or branched structure or are in the form of microgels.

In the PU dispersion according to the invention, 5 to 200 mEq (milliequivalents) of ionic groups, groups convertible into ionic groups and/or hydrophilic groups are present per 100 g of solid resin.

If the groups convertible into ionic groups are acidic groups, or if the ionic groups are anionic, then above 15 and below 100, particularly preferably above 18 and below 60 mEq/100 gram of solid resin are particularly preferably present.

If the groups convertible into ionic groups are basic groups, or if the ionic groups are cationic, then preferably above 30 and below 150, particularly preferably above 45 and below 100 mEq/100 g of solid resin are present.

In the hydrophilic groups, the 5 to 200 mEq relate to the lowest molecular weight constituents of such groups, thus for example to alkylene oxide units in polyalkylene oxide groups, for example to ethylene oxide groups in polyethylene oxide groups (such units are also known as repeat units).

Examples of ionic groups and groups convertible into ionic groups and hydrophilic groups contained in the PU dispersion according to the invention may be found in the following specification, which relates to the production of the PU dispersion.

The present invention also provides a process for the production of aqueous dispersions of polyurethane resins, which process is characterised in that a polyurethane prepolymer containing ionic groups, groups capable of ion formation and/or hydrophilic groups, which prepolymer has at least one group R'OSi—, in which

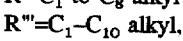 

R'=$C_1$ to $C_8$ alkyl or C(O)R''' and
R'''=$C_1$–$C_{10}$ alkyl, and which may be present in the presence of an organic solvent, is subjected to chain extension by adding an at least stoichiometric quantity of water to hydrolyse the SiOR' groups, converting the reaction product during or after chain extension, optionally after complete or partial neutralisation, into an aqueous dispersion and optionally removing any solvent present by distillation, wherein the proportions of the individual educts are selected in such a manner that the finished polyurethane resins satisfy the above-stated specifications relating to the definition of the dispersions.

The entire quantity of water necessary for production of the dispersion may be used for hydrolysis and the consequent chain extension. Preferably, however, hydrolysis initially proceeds with a smaller quantity of water, preferably up to a 10 times stoichiometric excess, preferably up to a 5 times stoichiometric excess, calculated relative to the quantity of water necessary to hydrolyse the R'OSi groups.

Production of the polyurethane (PU) prepolymers with R'OSi groups used for the process according to the invention may proceed, for example by:

1) production of a linear or branched, ungelled, and isocyanate-functional polyurethane prepolymer containing ionic groups, groups capable of ion formation and/or hydrophilic groups in an organic solvent or in the absence of solvents, 2) reaction of the free isocyanate groups of the PU prepolymer with one or more compounds of the general formula

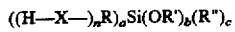 (I)

with X=O, S, NH or NR''', preferably NH or NR'''

R=a difunctional, trifunctional or tetrafunctional organic residue with a molecular weight of 13 to 500, preferably (ar)alkylene with 1 to 12 C atoms, particularly preferably alkylene with 1 to 12 C atoms, R'=$C_1$ to $C_8$ alkyl or C(O)R''', preferably $C_1$ to $C_4$ alkyl, R''=R'''=$C_1$ to $C_{10}$ alkyl, wherein R'' and R''' may be identical or different, R''''=$C_1$ to $C_8$ alkyl, a=1, 2 or 3, preferably 1, b=1, 2 or 3, preferably 2 or 3, c=0, 1 or 2, n=1 to 3, preferably 1 or 2, particularly preferably 1 wherein two or more residues R', R'' and R''' may be identical or different and in which the sum of a plus b plus c is four, optionally mixed with one or more alkanolamines bearing $NH_2$ and/or NH groups and with an OH functionality of at least 1.

Chain extension of the R'OSi—functionalised PU prepolymers proceeds after the addition of preferably up to a 10 times stoichiometric excess of the quantity of water necessary for hydrolysis of the SiOR' groups. Hydrolysis of the R'OSi groups proceeds rapidly. The HOSi groups formed by hydrolysis condense with elimination of water to form siloxane linkages so resulting in a chain-extended polyurethane resin which contains virtually no R'OSi and/or HOSi groups, i.e. these groups are present in such a small quantity that they cannot effect crosslinking.

The optionally neutralised reaction product may be converted into an aqueous dispersion by the addition of a sufficient quantity of water during or after chain extension. Chain extension proceeds in the resin phase; thus, if the resin is already dispersed by the addition of a sufficient quantity of water, chain extension proceeds within the particles of the dispersion.

Any optionally present solvent may optionally be removed from the aqueous dispersion by distillation.

In the process according to the invention, the proportions of the individual educts are selected in such a manner that the finished polyurethane resin contains 2 to 150 mmol, preferably 3 to 100 mmol, particularly preferably 7 to 70 mmol of siloxane linkages (—Si—O—Si—) per 100 g of solid resin, has a number average molecular weight (Mn) of 2500 to 1000000, a hydroxyl value of 0 to 100, preferably of 0 to 60 mg KOH/g relative to the solid resin and a content of ionic groups, groups convertible into ionic groups and/or hydrophilic groups of 5 to 200 mEq per 100 g of solid resin.

As an alternative to the sequential production process via NCO prepolymers described above, the R'OSi—functionalised PU prepolymers may also be produced in a so-called single stage process, i.e. the process stages 1) and 2) described above may be performed simultaneously by reacting the necessary educts together simultaneously.

When selecting the reactants, care must be taken to ensure that the reactivity of the —XH functional groups is not impaired.

The linear or branched, ungelled and isocyanate-functional PU prepolymer containing ionic groups, groups capable of ion formation and/or hydrophilic groups, hereinafter also described as a polyurethane prepolymer containing NCO groups, which proceeds for example in process stage 1), may for example be produced by reacting one or more compounds having at least two isocyanate-reactive groups, in particular one or more polyols, in particular diols, with one or more organic polyisocyanates, preferably diisocyanates, and with one or more compounds having more than one, preferably two, isocyanate-reactive groups and at least one ionic group, group capable of ion formation and/or hydrophilic group.

For example, according to the invention, a polyurethane prepolymer containing NCO groups usable as a starting product for the production of the PU dispersion according to the invention, may be produced by the reaction in an anhydrous environment of a) at least one linear or branched compound, which bears at least two isocyanate-reactive groups with an average molecular weight of 60 to 10000, preferably of 60 to 6000 b) at least one organic polyisocyanate, in particular diisocyanate, c) at least one compound with more than one isocyanate-reactive group and at least one ionic group, a group capable of ion formation and/or hydrophilic group with a number average molecular weight (Mn) of up to 10000, preferably of up to 2000, in an NCO/OH ratio of above 1 to 4:1.

According to a preferred embodiment of the invention, the above-stated component a) linear or branched compound is at least one polyol based on one or more polyethers, polyesters and/or polycarbonates having at least 2 OH groups per molecule and a number average molecular weight (Mn) of 600 to 10000, preferably of above 1000 and below 5000, optionally together with one or more at least difunctional low molecular weight alcohols and/or amines and/or aminoalcohols with a molecular weight of below 600, preferably of below 400.

All the production processes for the production of polyurethane prepolymers containing NCO groups may be performed as single or multiple stage processes.

The PU prepolymer containing isocyanate groups preferably has a content of urethane (—NHCOO—) and optionally urea (—NHCONH) groups of between 10 and 300 milliequivalents per 100 g of solid resin.

Preparation of the aqueous polyurethane dispersion according to the invention may be performed at any stage without organic solvents.

The compounds used as component a) for production of the PU prepolymer containing NCO groups may be, for example, a linear or branched polyol component, for example diols.

These are, for example, polyols used in PU chemistry familiar to the person skilled in the art. Examples are described, for example, in DE-A-42 28 510. If a linear diol component is used as the starting product, proportions of polyols with a functionality of 3 or more may be added to achieve branching of the polymer. The quantity selected here must be such that no gelation occurs during synthesis of the PU prepolymer containing NCO groups.

Suitable diols are, for example, also diols derived from fatty alcohols. Higher fatty alcohols with 8 to 22 carbon atoms may, for example, also be dimerised or trimerised to form long-chain polyols. The long-chain polyol is preferably a diol and particularly preferably $C_{36}$ dimeric diol, also known as a dimeric alcohol or dimeric fatty alcohol. These may readily be produced by hydrogenating dimeric fatty acids.

Polyether polyols of the general formula (II)

may be examples of the polyol component a), in which $R^4$ is hydrogen or a lower alkyl residue (for example $C_1$ to $C_6$ or $C_1$ to $C_4$), optionally with various substituents, n is 2,to 6 and m is 10 to 50 or still higher, wherein the residues $R^4$ are identical or different.

Polyester polyols may be stated as further examples of the polyol component a). The polyester polyols may be produced, for example, by esterifying organic dicarboxylic acids or the anhydrides thereof with organic polyols. The dicarboxylic acids and polyols may be aliphatic, cycloaliphatic or aromatic dicarboxylic acids and polyols.

The dicarboxylic acids may be long-chain dicarboxylic acids with 18 to 60 carbon atoms in the chain. The long-chain component may be an alkylene or aralkylene chain or a chain with similar hydrophobic properties. A preferred long-chain dicarboxylic acid is the $C_{36}$ dicarboxylic acid known as dimeric acid. $C_{36}$ dimeric fatty acid fractions substantially consist of a dimeric compound ($C_{36}$ dimeric carboxylic acids) together with up to approximately 20 to 22% of trimeric compound ($C_{54}$) . Such mixtures are described as dimeric fatty acid. A mixture with 97%. dimer and 3% trimer is preferred.

The polyesters preferably have a molecular weight of 300 to 6000, an OH value of 20 to 400 and an acid value of less than 3, preferably of less than 1. Linear polyesters are preferably used.

Polycarbonate diols, as are for example described in EP-A-0 427 979, may also, for example, be used as component a).

Polyester polyols, preferably diols, derived from lactones may furthermore be used as component a). These products are, for example, obtained by reacting an ε-caprolactone with a diol. Examples of such products are described in U.S. Pat. No. 3,169,945. The polylactone polyols obtained by this reaction are distinguished by the presence of a terminal hydroxyl group and by repeat polyester constituents derived from the lactone. These repeat molecule constituents may, for example, be of the general formula

in which n is preferably 4 to 6 and the substituent R is hydrogen, an alkyl residue, a cycloalkyl residue or an alkoxy residue, wherein no substituent contains more than 12 carbon atoms and the total number of carbon atoms in the substituents of the lactone ring does not exceed 12.

The lactone used as the starting material may be any desired lactone or any desired combination of lactones, wherein this lactone preferably contains at least 6 carbon atoms in the ring, for example 6 to 8 carbon atoms and wherein at least two hydrogen substituents should be present on the carbon atom which is attached to the oxygen group of the ring. The lactone used as the starting material may be represented by the following general formula IV:

in which n and $R^5$ have the meaning already stated.

The lactones preferred in the invention for production of the polyester diols are the ε-caprolactones in which n has a value of 4. The most preferred lactone is the unsubstituted ε-caprolactone in which n has a value of 4 and all $R^5$ substituents are hydrogen. This lactone is particularly preferred because it is available in large quantities and the resultant polylactone diols yield coatings with excellent properties. Various other lactones may moreover be used individually or in combination.

Examples of aliphatic diols suitable for reaction with the lactone include ethylene glycol, 1,3-propanediol, 1,4-butanediol and/or dimethylolcyclohexane.

The isocyanate-reactive compound usable as component a) may, for example, be polythioethers containing OH groups and/or SH groups, such as condensation products of thiodiglycol with itself and/or with other glycols, dicarboxylic acids, hydroxycarboxylic acids, formaldehyde, aminocarboxylic acids or aminoalcohols. The products are either mixed polythioethers, polythioether esters or polythioether ester amides.

polyacetals containing OH groups, prepared for example from the above-stated polyols, in particular diethylene glycol, triethylene glycol, 4,4'-dioxyethoxydiphenyldimethylene, 1,6-hexanediol and formaldehyde. Suitable polyacetals may also be obtained by polymerisation of cyclic acetals.

polyether esters containing isocyanate-reactive groups.

polyester amides and polyamides containing OH groups, including preferably linear condensation products prepared from polybasic saturated and unsaturated carboxylic acids or the anhydrides thereof and polyhydric, saturated and unsaturated aminoalcohols, diamines, polyamines or mixtures thereof.

dihydroxypolyester carbonates.

polyurethane diols, which may be produced either from appropriate carbonates and diamines or, as conventional, from appropriate polyols and polyisocyanates.

poly(meth)acrylate polyols, in particular poly(meth)acrylate diols.

polybutadiene oil diols, hydroxy-functionalised siloxane copolymers, such as, for example, α,ω-dihydroxypolyether polydimethylsiloxane copolymers.

These classes of compounds may be used alone or as mixtures of two or more thereof. Compounds corresponding to two or more of these classes (intramolecular mixtures) may also be used.

The low molecular weight compounds which may also optionally be used in a) are in particular alcohols and amines. These are the compounds of a molecular weight of below 600, preferably of below 300, which have hydroxyl and/or amino groups and are at least difunctional with regard to the isocyanate addition reaction known from polyurethane chemistry. Compounds which may be considered are not only compounds which are difunctional with regard to the isocyanate addition reaction but also at least trifunctional compounds or any desired mixtures of such compounds.

Any desired organic polyisocyanates, such as for example diisocyanates, may be used as component b) for the production of the polyurethane dispersion. Aliphatic, cycloaliphatic or aromatic as well as sterically hindered isocyanates may be used. Polyisocyanates, for example diisocyanates, containing ether or ester groups may also, for example, be used. Examples of suitable diisocyanates are trimethylene diisocyanate, tetramethylene diisocyanate, pentamethylene diisocyanate, hexamethylene diisocyanate, propylene diisocyanate, ethylene diisocyanate, 2,3- dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate, 2,6-tolylene diisocyanate, 1-isocyanatomethyl-5-isocyanato-1,3,3-trimethylcyclohexane, bis-(4-isocyanatocyclohexyl) methane, bis-(4-isocyanatophenyl)methane, 4,4-diisocyanatodiphenyl ether, 1,5-dibutylpentamethylene diisocyanate, tetramethylxylylene diisocyanate, 2,3-bis-(8-isocyanatooctyl)-4-octyl-5-hexylcyclohexane, 3(4)-isocyanatomethyl-1-methylcyclohexyl isocyanate and/or 2,6-diisocyanatomethyl caproate.

Non-yellowing and/or sterically hindered isocyanates with 4 to 25, preferably 6–16 C atoms, which contain one or two linear, branched or cyclic alkyl groups with 1 to 12, preferably 1 to 4 C atoms, in a position relative to the NCO group, are preferably used. The parent structure may consist of an aromatic or alicyclic ring or of an aliphatic linear or branched C chain with 1 to 12 C atoms. Examples of such compounds are isophorone diisocyanate, bis-(4-isocyanato-cyclohexyl)methane, 1,1,6,6-tetramethylhexamethylene diisocyanate, 1,5-dibutylpentamethylene diisocyanate, 3(4)-isocyanatomethyl-1-methylcyclohexyl isocyanate, p- and m-tetramethylxylylene diisocyanate and/or the corresponding hydrogenated homologues thereof.

Small proportions of more highly functional isocyanates, such as for example biuret or isocyanurate type polyisocyanates, or products obtained by reacting an excess of diisocyanate with polyols, may optionally also be added. This approach is, however, not preferred.

The compounds which may be used according to the invention as component c) are preferably low molecular weight compounds which contain more than one, preferably two or at least two isocyanate-reactive groups and at least one ionic group, group capable of ion formation and/or hydrophilic group. Anionic or anion-forming groups are preferred. Suitable isocyanate-reactive groups are in particular hydroxyl groups and primary and secondary amino groups. Acidic groups capable of anion formation which may be considered are, for example, carboxyl, phosphoric acid and sulphonic acid groups. Basic groups convertible into cations which may be considered are, for example, primary, secondary and tertiary amino groups or onium groups, such as quaternary ammonium, phosphonium and/or tertiary sulphonium groups. The anionic groups which are preferably to be introduced according to the invention are carboxyl groups; they may, for example, be introduced by using hydroxyalkanoic carboxylic acids of the following general formula as component c):

$(HO)_xQ(COOH)_y$ in which

Q represents a linear or branched hydrocarbon residue with 1 to 12 C atoms and x and y each mean 1 to 3. Examples of such acids are citric acid and tartaric acid. Those carboxylic acids in which x=2 and y=1 are preferred. Examples of such acids are described in U.S. Pat. No. 3,412,054. A preferred group of dihydroxy-alkanoic acids comprises α,α-dimethylolalkanoic acids of the general formula

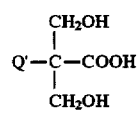

in which Q is hydrogen or $C_1$–$C_8$ alkyl. The most highly preferred compounds are α,α-dimethylolpropionic acid and α,α-dimethylolbutyric acid.

Further examples of dihydroxyalkanoic acids which may be used are dihydroxypropionic acid, dimethylolacetic acid, dihydroxysuccinic acid or dihydroxybenzoic acid. Polyhydroxy acids obtainable by oxidising monosaccharides, for example gluconic acid, saccharic acid, mucic acid and glucuronic acid are also suitable.

Usable acids containing amino groups are, for example, α,α-diaminovaleric acid, 3,4-diaminobenzoic acid, 2,4-diamino-(5)-toluenesulphonic acid and 4,4-diamino-diphenyl ether sulphonic acid.

Acidic polyesters as described in DE-A-39 03 804 may also be used as component c) according to the invention. These polyethers preferably have a molecular weight of 300 to 2000, a hydroxyl value of 56 to 374 and an acid value of 28 to 187.

Polyurethane polyols containing ionic groups or groups convertible into ionic groups may also be used as component c).

Such a polyurethane polyol is obtained in prepolymer form with terminal OH groups by, for example, reacting one or more polyisocyanates, as for example stated for component b), with an excess of one or more compounds as stated for component a) and with at least one compound as stated for component c).

Component c) may also include nonionic hydrophilic polyols. These are, for example, compounds having polyether chains with incorporated ethylene oxide units. These are compounds with one or two hydrogen atoms capable of reacting with isocyanates, which compounds bear polyether chains with ethylene oxide, for example, in the side chain or mixtures thereof. These are, for example, compounds of the general formula

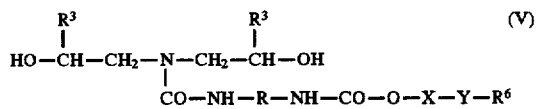

in which

R the residue arising from an isocyanate component, for example from an isocyanate as stated above, $R^3$=H, linear or branched $C_1$–$C_8$ alkyl, $R^6$=$C_1$–$C_{12}$ alkyl, preferably unsubstituted $C_1$–$C_4$ alkyl, X=a residue as obtained by removing the terminal oxygen atom from a polyalkylene oxide chain with 5 to 90, preferably 20 to 70 chain members, wherein the chain members consist to an extent of at least 40%, preferably of 65%, of ethylene oxide units and which, in addition to ethylene oxide units, may for example also represent propylene oxide, butylene oxide or styrene oxide units. Of the latter-stated units, propylene oxide units are preferred.

Y=—O— or —$NR^6$—, wherein $R^6$ is defined as above. Compounds V to VII may be produced, for example, analogously to U.S. Pat. Nos. 3,920,598, 3,905,929, 4,190,566 or U.S. Pat. No. 4,237,264.

The anionic, cationic or nonionic groups of component c) act to stabilise the aqueous dispersion. Ionic and nonionic groups may be used together. Stabilisation by ionic groups is preferred, particularly preferably by anionic groups.

Dihydroxycarboxylic acids are preferred for production of an anionic urethane prepolymer. Dimethylolpropionic acid is particularly preferred. Component c) is preferably used in a quantity of approximately 0.4 to approximately 7.5 wt. %, particularly preferably of approximately 0.8 to 5.0 wt. % (calculated as carboxyl group, COOH), relative to the urethane prepolymer used (solid resin). If the quantity of carboxyl groups is below approximately 0.4 wt. %, it is difficult to produce a stable emulsion. On the other hand, if the quantity exceeds 7.5 wt. %, hydrophilic properties are increased, making the emulsion highly viscous and reducing the water resistance of the coating.

The quantities of a), b) and c) are selected such that, when reacted, a reaction product with terminal NCO groups is produced, i.e. an excess of polyisocyanate is used. The reaction may be performed with an NCO to OH ratio of above 1 to 4:1, the range from 1.1 to 2:1 is preferred, that from 1.1 to 1.7:1 particularly preferred. The polyurethanes are preferably those having less than 280 milliequivalents of —NHCOO— per 100 g of solid resin. The reaction product may have a branched structure, but a linear structure is generally preferred.

The polyurethane prepolymer containing NCO groups is reacted with one or more compounds of the general formula

with X=O, S, NH or NR''', preferably NH or NR''',

R=a difunctional to tetrafunctional, preferably difunctional, organic residue with a molecular weight of 13 to 500, preferably (ar)alkylene with 1 to 12 C atoms, particularly preferably alkylene with 1 to 12 C atoms, R'=$C_1$ to $C_8$ alkyl or C(O)R''', preferably $C_1$ to $C_4$ alkyl, R''=R'''=$C_1$ to $C_{10}$ alkyl, R'''=$C_1$ to $C_8$ alkyl, a=1, 2 or 3, preferably 1, b=1, 2 or 3, preferably 2 or 3, c=0, 1 or 2, n=1 to 3, preferably 1 or 2, particularly preferably 1 and in which the sum of a plus b plus c is four, optionally mixed with one or more alkanolamines bearing $NH_2$ and/or NH groups and with an OH functionality of at least 1, to yield an R'OSi—functionalised PU prepolymer containing ionic groups, groups capable of ion formation and/or hydrophilic groups.

The compounds of the formula (I) are silane derivatives which contain groups of the type (H—X—)$_n$R containing active hydrogen and capable of addition with isocyanate groups. Amine groups are preferred as functional groups HX— containing active hydrogen n has a value of 1 to 3, n preferably assumes the value 1. The residue R is a difunctional to tetrafunctional, preferably difunctional, organic residue which may bear chemically inert groups or substituents, having a molecular weight of 13 to 500. Residue R is preferably a difunctional (ar)alkylene residue with 1 to 12 C atoms. An alkylene residue with 1 to 12 C atoms is particularly preferred as residue R.

The silane derivative of the formula (I) furthermore contains 1 to 3, preferably 2 or 3, groups —OR' attached to the silicon, wherein R' preferably has the meaning of $C_1$ to $C_8$ alkyl.

Some preferred examples of compound (I) which may be cited are β-aminoethyltriethyoxysilane, γ-aminopropyltriethoxysilane, 7-aminopropyltrimethoxysilane, 7-aminopropylethyldiethoxysilane, 7-aminopropylphenyldiethoxysilane, 7-aminopropyltrimethoxysilane, 6-aminobutyltriethoxysilane, 6-aminobutylethyldiethoxysilane, N-(2-aminoethyl-3-aminopropyl)trimethoxysilane, N-2-aminoethyl-3-aminopropyl-tris-(2-ethylhexoxy)silane, 6-(aminohexylaminopropyl)trimethoxysilane, N-aminoethyl-3-aminopropylmethyldimethoxysilane.

The reaction of the NCO-functional polyurethane prepolymer yield the R'OSi—functionalised PU prepolymer proceeds with the HX groups of compound I being completely consumed. The isocyanate groups and HX groups are preferably reacted together stoichiometrically in a 1:1 ratio. It is, however, also possible to perform the reaction with an excess of isocyanate groups. The remaining isocyanate groups may be used for further synthesis reactions, for example by reaction with water, hydrazine, carboxylic acid hydrazides, polyols or amines.

The polyurethane resin on which the polyurethane dispersion according to the invention is based may have hydroxyl groups. If this is desired, the polyurethane prepolymer containing NCO groups is reacted during production of the R'OSi—functionalised PU prepolymer with at least one compound of the general formula I and with at least one alkanolamine bearing at least one $NH_2$ and/or NH group and having a functionality of at least 1. The reaction proceeds with complete consumption of the HX groups of compound I and the NH groups of the alkanolamine. The isocyanate groups of the NCO-functional PU prepolymer are preferably reacted in a stoichiometric ratio with the HX groups of I and the NH groups of the alkanolamine. In this reaction, the alkanolamine and compound I may be reacted with the NCO-functional polyurethane prepolymer either mixed together or in succession.

The alkanolamines bearing the $NH_2$ and or NH groups and having a functionality of at least 1 are compounds which may act as sources of hydroxyl groups in the polyurethane resin dispersion according to the invention. The NH or $NH_2$ groups of the alkanolamines are considerably more reactive towards the isocyanate groups of the NCO-functional PU prepolymer than are the OH groups thereof, i.e. the NH groups preferentially react with the isocyanate groups to form urea.

Examples of suitable alkanolamines having an OH functionality of at least 1 are monoalkanolamines and dialkanolamines, for example diethanolamine, N-methylethanolamine, diisopropanolamine, N-ethylisopropanolamine, monoisopropanolamine, ethanolamine, 2,2-aminoethoxyethanol, monoethylethanolamine, butylethanolamine, cyclohexylethanolamine, 3-aminopropanol, 2-amino-1-butanol.

Other monofunctional compounds reactive towards NCO groups, for example monoamines and/or monoalcohols with $C_6$ to $C_{30}$ alkyl residues may also be used instead of the alkanolamines bearing $NH_2$ and/or NH groups. Fatty amines and/or fatty alcohols having more than 12 C atoms are particularly preferred here. In this case, polyurethane resins with siloxane linkages are obtained which contain no hydroxyl groups. Monoamines and/or monoalcohols may, of course, also be used mixed with the alkanolamines bearing the $NH_2$ or NH groups. The OH value of the resultant polyurethane resin with siloxane linkages may in this manner be adjusted at will within the range according to the invention of 0 to 100.

An essential feature of the invention in the production of the polyurethane resin, on which the polyurethane dispersion according to the invention is based, consists in a quantity of water sufficient for hydrolysis of the R'OSi groups being added to the R'OSi—functionalised PU prepolymer, which optionally has hydroxyl groups. The water is preferably added in an excess of up to 10 times the quantity of water necessary to hydrolyse the R'OSi groups. One to five times the stoichiometric quantity of water is particularly preferably added.

The hydrolysis reaction, together with the accompanying chain extension, may if desired be performed at elevated temperature. Temperatures of up to 950° C. are, for example, suitable.

The silanol groups formed by hydrolysis condense to form siloxane linkages. This leads to the intended increase in molecular weight arising from chain extension. Depending upon the R'OSi—functionalised PU prepolymer used, linear, branched or crosslinked products are obtained which contain virtually no R'OSi and/or HOSi groups. Formation of the siloxane linkages proceeds in the disperse or non-disperse resin phase, i.e. before or after conversion into the aqueous dispersion.

The polyurethane resin has ionic groups, groups capable of ion formation and/or hydrophilic groups. If the polyurethane resin contains groups capable of ion formation, these are partially or entirely converted into the corresponding salts with a suitable compound, for example a neutralising agent. This may occur at any stage of the synthesis described above, wherein care must be taken to ensure that the compounds used for salt formation are selected in such a manner that they are chemically inert during the synthesis. The compounds used for salt formation, such as for example neutralising agents, are preferably added together with the water necessary for hydrolysis.

Preferred ion-forming groups are those which are capable of anion formation. Examples of such groups are described above for synthesis of the PU prepolymer containing the NCO groups. A base, for example an amine, preferably a tertiary amine, is then used for conversion into anions. Suitable tertiary amines are, for example, trialkylamines, such as trimethylamine, triethylamine, triisopropylamine, tri-n-propylamine and tri-n-butylamine; N-alkylmorpholines, such as N-methylmorpholine and N-ethylmorpholine; N-dialkylalkanolamines, such as N-dimethylethanolamine, N-diethylethanolamine and N-dimethylisopropanolamine and mixtures of at least two of these compounds.

If the polyurethane resin contains cation-forming groups, one or more acids are preferably used for ion formation. Suitable acids are, for example, phosphoric acid or acidic phosphoric acid esters, or organic carboxylic acids such as formic acid, acetic acid, propionic acid, acrylic acid, hydroxycarboxylic acids such as lactic acid, dimethylolpropionic acid or citric acid, or dicarboxylic acids such as malonic acid, glutaric acid or oxalic acid. Mixtures of the acids may also be used.

A quaternisation reaction with alkylating agents, such as for example reaction with alkyl halides or epoxides, is, however, also possible.

The reaction of the components used to synthesise the NCO-functional PU prepolymer and the further reaction to yield the R'OSi—functionalised PU prepolymer proceed in an anhydrous environment, for example at temperatures of 20 to 140° C, preferably between 50° and 100° C. The reactions may be performed without solvents or in organic solvents suitable for polyurethane synthesis familiar to the person skilled in the art. Water-miscible or water-immiscible solvents may be used as the solvents. In general, it is advantageous to use those solvents which may be removed at any stage of the production of the PU dispersion according to the invention (for example after the completion thereof), for example by distillation, optionally under reduced pressure.

Examples of suitable solvents are ketones, for example acetone, methyl ethyl ketone, methyl isobutyl ketone; N-alkylpyrrolidones, such as for example N-methylpyrrolidone; ethers, such as for example diethylene glycol dimethyl ether, dipropylene glycol dimethyl ether, or also cyclic urea derivatives, such as for example 1,3-dimethyl-3,4,5,6-tetrahydro-2(1H)-pyrimidinone.

The polyurethane resin which is solvent-free or in organic solution is converted into the aqueous phase by adding sufficient quantities of water. The quantity of water sufficient for conversion into the aqueous phase may be added after conclusion of chain extension. It is also possible to add the principal quantity of water during chain extension or after hydrolysis of the R'OSi groups. A finely divided polyurethane dispersion with an average particle size of greater than 10 and less than 2000 nm, preferably of above 50 and below 500 nm, is obtained. The distribution may here be monomodal or bimodal, preferably monomodal.

It is not generally necessary also to use emulsifiers to convert the polyurethane resins used according to the invention into aqueous dispersions. This does not, however, exclude the addition of ionic and nonionic emulsifiers in order to facilitate emulsification and optionally to reduce the number of ionisable groups.

The educts are reacted together during production of the polyurethane dispersion according to the invention in such quantities that the binder qualities desired by the person skilled in the art, such as for example water dispersibility, viscosity behaviour, film forming characteristics, storage stability, are achieved. Properties, such as for example hardness and weathering resistance, of the coatings obtained from the dispersions may also be influenced by selection of the nature and quantity of the components. The person skilled in the art may readily select the nature and quantity of the components using the teaching referred to here, optionally combined with routine testing. Overall, the quantities of the individual educts are preferably selected and the reaction controlled in such a manner that the polyurethane resin on which the polyurethane dispersion according to the invention is based contains 2 to 150 mmol of siloxane linkages (—Si—O—Si—) per 100 g of solid resin, a number average molecular weight (Mn) of 2500 to 1000000, a hydroxyl number of 0 to 100, preferably of 0 to 60 mg KOH/g, relative to solid resin, and a content of ionic groups, groups convertible into ionic groups and/or hydrophilic groups of 5 to 200 mEq per 100 g of solid resin.

The aqueous PU dispersion of the resin chain-extended by the formation of siloxane linkages may be produced using known processes. For example, it is possible initially to introduce the neutralised resins and to combine them with water with thorough dispersion. It is also possible initially to introduce the water phase optionally containing neutralising agent and to incorporate the resin by stirring. A continuous method is also possible, i.e. resin, water and neutralising agent are homogeneously mixed together in known units, for example a rotor/stator mixer. Conversion into the aqueous phase may also be supported by elevated temperature.

The pH value of the resultant polyurethane dispersion may, for example, be adjusted to a value of between 5 and 10. A finely divided, opaque to milkily turbid aqueous dispersion is obtained from the components.

The anionic PU dispersions according to the invention or preferably used according to the invention have an acid value of 5 to 90 (relative to solids), preferably of above 10 and below 50. The solids content is between 25 and 65 wt. %, preferably above 35 and below 60 wt. %. The number average molecular weight (Mn) of the polyurethane resins contained in the PU dispersions according to the invention or used according to the invention is, for example, 2500 to 1000000, wherein the lower limit is preferably 5000, particularly preferably 20000 and the upper limit up to 500000.

Any solvents optionally contained in the polyurethane dispersions according to the invention may, if desired, be removed by distillation. This may proceed under reduced pressure.

The present invention also provides the aqueous coating compositions, preferably aqueous base lacquers, which may be produced from the PU dispersions according to the invention containing siloxane linkages. The aqueous coating compositions may be self-drying (physically drying) or extrinsically crosslinking. The PU resins on which the PU dispersions according to the invention are based have hydroxyl values of between 0 and 100, preferably of between 0 and 60 mg KOH/g. If the PU dispersions according to the invention are used in extrinsically crosslinking coating compositions, the hydroxyl value is preferably towards the upper end of the range of values.

In order to produce aqueous coating compositions, preferably aqueous base lacquers, pigments, further binders, additives together with small quantities of solvents are, for example, added to the PU dispersions.

The coating compositions according to the invention may contain one or more further binders in addition to the polyurethane resin dispersion according to the invention. This may, for example, be favourable in order to achieve synergistic effects. Examples of further binders are conventional film forming water-soluble or water-dilutable resins familiar to the person skilled in the art, such as water-dilutable polyester resins, water-dilutable polyacrylate resins and/or other water-dilutable polyurethane resins. The resins may be reactive or non-functional. The quantity of added resins may be 0 to 75 wt. %, preferably 0 to 50 wt. % of the total resin solids content. 0 to 30 wt. % are particularly preferred. In this connection, total resin solids means the sum of all binders without the content of crosslinking agent.

The specification and quantity of additional binders are selected in such a manner that a mixture is preferably obtained which has on average a content of ionic groups, groups convertible into ionic groups and/or hydrophilic groups of 5 to 200 mEq per 100 g of solid resin. Anionic groups are preferred.

The further added binders may optionally be precondensed at elevated temperatures with the polyurethane resins defined according to the invention.

Usable water-dilutable polyesters are, for example, those with free carboxyl groups, i.e. polyesters with an elevated acid value. There are essentially two known methods for incorporating the necessary carboxyl groups into the resin system. The first method consists in terminating esterification at the desired acid value. In this method, the incorporation of sterically hindered carboxyl groups is preferred, for example by condensation with dimethylolpropionic acid. Once neutralised with bases, the polyesters obtained in this manner are soluble in water. The second approach consists in forming partial esters of di- or polycarboxylic acids with high-hydroxyl polyesters with a low acid value. Anhydrides of the dicarboxylic acids are conventionally used for this reaction, which anhydrides are reacted with the hydroxyl component under mild conditions to form a free carboxyl group.

Usable water-dilutable polyacrylate resins, like the polyester resins described above, may contain free carboxyl groups. These are, for example, acrylic or methacrylic copolymers and the carboxyl groups originate from the acrylic or methacrylic acid content.

Examples of additional polyurethane dispersions should be taken to be those as described in DE-A-36 28 125. These are anionically stabilised PU dispersions which may be obtained by reacting polyols, diisocyanates, ionic compounds together with chain extension with amines. PU dispersions stabilised by nonionic hydrophilic groups may also be added to the coating compositions according to the invention.

The water-dilutable polyesters or polyurethane resins may also be acrylated or grafted by suitable dispersion polymerisation processes. Examples of usable acrylated polyurethane dispersions are described in DE-A-41 22 265.

A further group of aqueous dispersions which may be added to the coating compositions according to the invention are dispersions described in DE-A-36 28 124 based on ionic polycondensation products containing epoxide groups which are reacted with copolymerisable unsaturated monomers.

When adding further binders, it is self-evident that additional ionically stabilised resins and dispersions may only be used with identically charged ionic dispersions according to the invention, in order not to have a negative influence on stability.

Various crosslinking agents may be used to prepare the coating compositions according to the invention, such as for example formaldehyde condensation resins, such as phenol/formaldehyde condensation resins and amine/formaldehyde condensation resins, together with blocked polyisocyanates. The crosslinking agents may be used individually and as mixtures. The mixing ratio of crosslinking agent to polyurethane resin is preferably 10:90 to 40:60, particularly preferably 20:80 to 30:70, in each case relative to the weight of solids. If further binders are used in addition to the polyurethane resin dispersion according to the invention, the above mixing ratios preferably relate to the complete resin solids content.

Amine resins suitable as crosslinking agents include, for example, alkylated condensation products produced by reacting aminotriazines and amidotriazines with aldehydes. Amines or compounds bearing amino groups such as melamine, guanamine, acetoguanamine, benzoguanamine, dicyanodiamide or urea are condensed-with aldehydes, in particular formaldehyde, in the presence of alcohols, such as methanol, ethanol, propanol, butanol or hexanol. The reactivity of such amine resins is determined by the degree of condensation, the ratio of the amine or amide components to formaldehyde and by the nature of the etherification alcohol used. Examples of such resins and the production thereof are described in Houben-Weyl, Methoden der organischen Chemie, 1963, page 357. These are common commercial products.

Blocked polyisocyanates may also be used as crosslinking agents. Any desired polyisocyanates, in which the isocyanates have been reacted with a compound in such a manner that the resultant blocked polyisocyanate is resistant to hydroxyl groups and water at room temperature, but reacts at elevated temperatures, for example in the range from approximately 90° to approximately 250° C., may be used in the invention. Any desired suitable organic polyisocyanates suitable for crosslinking may be used to produce the blocked polyisocyanates. Preferred are those isocyanates containing approximately 3 to approximately 36, in particular approximately 8 to 15 carbon atoms. Examples of suitable diisocyanates are the diisocyanates stated above as component b).

Polyisocyanates of relatively high isocyanate functionality, as stated above in b), are preferably used. Examples of these substances are tris-(4-isocyanatophenyl)-methane, 1,3,5-triisocyanatobenzene, 2,4,6-triisocyanatotoluene, 1,3,5-tris-(6-isocyanatohexane)biuret, bis-(2,5-diisocyanato-4-methylphenyl)methane and polymeric polyisocyanates, such as dimers and trimers of diisocyanatotoluene. Mixtures of polyisocyanates may also be used.

The organic polyisocyanates which may be considered as crosslinking agents-in the coating compositions according to the invention may also be prepolymers, for example derived from a polyol. To this end, polyols are reacted in a conventional manner with an excess of polyisocyanates, so yielding prepolymers with terminal isocyanate groups.

The blocked polyisocyanates which may be used according to the invention as crosslinking agents may be blocked with conventional, volatile monovalent blocking agents, as are used in lacquer chemistry. Examples of such substances are various alcohols, oximes, phenols, NH-functional nitrogen heterocyclics, such as pyrazole derivatives or triazole derivatives, amines, 9-keto compounds and phthalimide. The polyisocyanates may be blocked within a single molecule with identical or different blocking agents. Mixtures of differently blocked polyisocyanates as well as polyisocyanates which are intramolecularly differently blocked may also be used as blocking agents.

The coating compositions according to the invention may also contain polymer microparticles known to the person skilled in the art. Crosslinked or uncrosslinked microparticles may be used. Examples of such polymer microparticles are described in EP-A-0 038 127 and EP-A-0 234 362.

The coating compositions may contain lacquer additives, for example agents influencing rheological properties, such as highly disperse silica, inorganic phyllosilicates or polymeric urea compounds. Water-soluble cellulose ethers, such as hydroxyethylcellulose, methylcellulose or carboxymethylcellulose, together with synthetic polymers with ionic groups and/or groups with an associative action such as polyvinyl alcohol, poly(meth)acrylamide, poly (meth)acrylic acid, polyvinylpyrrolidone, styrene/maleic anhydride or ethylene/maleic anhydride copolymers and the derivatives thereof or also hydrophobically modified ethoxylated polyurethanes or polyacrylates also act as thickeners. Antisettling agents, levelling agents, light stabilisers, antifoaming agents, such as for example compounds containing silicon; wetting agents together with coupling substances may also be used. Wetting agents are also taken to include known paste resins which may be used to improve pigment dispersion and grinding. Catalysts may optionally be used to accelerate curing, but it is also possible to cure with thermal energy without using a catalyst.

Suitable solvents present in small quantities are conventional lacquer solvents, which may originate from production of the binders or be added separately. Examples of such solvents are mono- or polyhydric alcohols, for example propanol, butanol, hexanol; glycol ethers or esters, for example diethylene glycol dialkyl ethers, dipropylene glycol dialkyl ethers, in each case with $C_{1-6}$ alkyl, ethoxypropanol, ethylene glycol monobutyl ether; glycols, for example ethylene glycol; propylene glycol and the oligomers thereof, N-methylpyrrolidone together with ketones such as methyl ethyl ketone, acetone, cyclohexanone; aromatic or aliphatic hydrocarbons, for example toluene, xylene or $C_6$–$C_{12}$ linear or branched aliphatic hydrocarbons.

The flow-out and viscosity of the coating composition may be influenced by the selection of the solvents. Flashing-off behaviour may be influenced by the boiling point of the solvent mixture used.

The coating compositions according to the invention may contain one or more inorganic and/or organic colouring and/or effect pigments and optionally additionally at least one extender.

Examples of effect pigments are metal pigments, for example made of aluminium, copper or other metals; interference pigments, such as for example metal oxide coated metal pigments, for example titanium dioxide coated aluminium, coated micas, such as for example titanium dioxide coated mica and graphite effect pigments. Examples of colouring pigments and extenders are titanium dioxide, micronised titanium dioxide, iron oxide pigments, carbon black, silicon dioxide, barium sulphate, micronised mica, talcum, kaolin, chalk, azo pigments, phthalocyanine pigments, quinacridone pigments, pyrrolopyrrole pigments, perylene pigments.

The effect pigments are generally initially introduced in the form of a conventional commercial aqueous or non-aqueous paste, optionally combined with preferably water-dilutable, organic solvents and additives and then mixed with the aqueous binder with shearing. Pulverulent effect pigments may first be converted into a paste with preferably water-dilutable organic pigments and additives. Care must be taken to ensure that lamellar effect pigments are not damaged mechanically during mixing.

Coloured pigments and/or extenders may, for example, be ground in a proportion of the aqueous binder. Grinding may also be performed in a special water-dilutable paste resin. One example of a polyurethane-based paste resin preferably usable in the aqueous base lacquer according to the invention may be found in DE-A-40 00 889. Grinding may be performed in conventional units familiar to the person skilled in the art. The finished ground colour pigment preparation is then formulated with the remainder of the aqueous binder or aqueous paste resin.

If paste resins are present in the coating composition, these are added to the binder plus any optionally present crosslinking agent when calculating the resin solids content.

If the aqueous lacquer according to the invention is formulated on the basis of the preferred anionically stabilised PuJ dispersion chain-extended with siloxane linkages, it contains bases as the neutralising agent. Examples are ammonia or organic amines such as triethylamine, N-methylmorpholine, aminoalcohols such as dimethylisopropanolamine, dimethylethanolamine, 2-amino-2-methyl-1-propanol.

The coating compositions according to the invention are preferably formulated as aqueous base lacquers, as are used in multilayer lacquer coatings and overcoated with transparent clear lacquers. Such an aqueous base lacquer has a solids content of, for example, 10 to 50 wt. %, for effect base lacquers it is preferably 15 to 30 wt. %, for plain coloured lacquers it is preferably higher, for example 20 to 45 wt. %. The ratio of pigment to binder optionally plus crosslinking agent optionally plus paste resin in the aqueous base lacquer is, for example, between 0.03:1 to 3:1, for effect base lacquers it is, for example, preferably 0.06:1 to 0.6:1, for plain coloured base lacquers it is preferably higher, for example 0.06:1 to 2.5:1, in each case relative to the weight of solids.

The solvent content of the aqueous base lacquer according to the invention is preferably below 20 wt. %, particularly preferably below 15 wt. %, in particular preferably below 10 wt. %.

Aqueous base lacquers according to the invention may be applied using conventional methods. They are preferably applied by spraying to a dry film thickness of 8 to 50 μm, for effect base lacquers the dry film thickness is, for example, preferably 10 to 25 μm, for plain coloured base lacquers it is preferably higher, for example 10 to 40 μm. Application is preferably performed wet-on-wet, i.e. after a flashing-off period, for example at 20°–80° C., the aqueous base lacquer layers are overcoated with a conventional clear lacquer to a dry film thickness of preferably 30 to 60 μm and dried or crosslinked together with this latter at temperatures of, for example, 20° to 140° C. The drying conditions for the topcoat lacquer layer (base lacquer and clear lacquer) are determined by the clear lacquer system used. They may, for example, be 20° to 150° C. For repair purposes, temperatures of 20° to 80° C. are, for example, preferred. For original lacquer coating purposes, temperatures of above 100° C., for example of above 110° C., are preferred.

Suitable clear lacquers are in principle any known clear lacquers or transparently pigmented coating compositions. It is possible to use 1- or 2-component lacquers containing solvent, water-borne clear lacquers, powder coatings or radiation curable clear lacquers for this purpose.

Multilayer lacquer coatings produced in this manner may be applied onto the most varied kinds of substrates. In general, the substrates are of metal or plastic. These are frequently precoated, i.e. plastic substrates may, for example, be provided with a plastic primer, metallic substrates generally have an electrophoretically applied primer and optionally additionally one or more further lacquer layers, such as for example a surfacer (primer-surfacer) layer. These layers are generally fully cured. The aqueous base lacquer according to the invention may, however, be applied wet-on-wet onto uncrosslinked surfacer layers, as for example described in EP-A-0 238 037. In this case, the base lacquer is generally stoved together with the surfacer layer before application of a clear lacquer topcoat layer.

It is also possible to apply the aqueous base lacquer according to the invention directly, without further interlayers, onto a stoved or unstoved electrocoating layer, as is also possible for other known solvent-based or water-based base lacquers.

The coating compositions according to the invention are excellently suitable for lacquer coating other substrates, in particular inorganic substrates, such as concrete, wood and for coating sheets (plastic films and paper sheets) and for the production of thin layers to bond two or more substrates together.

The coating compositions formulated with the polyurethane resin dispersions according to the invention are distinguished by good storage stability. The dispersion is straightforwardly dilutable with water; there is little requirement for cosolvents. Coating compositions formulated according to the invention exhibit excellent atomisation behaviour when applied by spraying. Very good interlayer adhesion is achieved when producing multilayer structures. Good metallic effects are achieved when formulating metallic lacquers, even if the polyurethane dispersion according to the invention is used as the sole binder in aqueous base lacquers.

Multilayer lacquer coatings obtained with aqueous base lacquers according to the invention fulfil current conventional automotive lacquer requirements. Aqueous base lacquers according to the invention are thus suitable for automotive original and repair lacquer coatings, but they may also be used in other sectors, for example lacquer coating plastics, in particular for lacquer coating automotive components.

This invention also relates to a substrate coated with a multilayer coating obtained by applying at least one primer layer, preferably based on a water-borne coating composition, applying a coloured base lacquer layer with a coating composition according to the invention, optionally drying the base layer and applying a transparent coating composition as the topcoat layer and subsequently heating the coated substrate. Further additional layers may optionally be added to this multilayer lacquer coating.

The multilayer lacquer coating according to the invention has a good surface. The adhesion between the layers and the base lacquer layer is good and, even when exposed to a moist climate, exhibits no delamination defects. This invention is particularly suitable for use in automotive lacquer coating (original and repair lacquer coating).

Multilayer lacquer coatings produced using aqueous base lacquers according to the invention which contain PU dispersions chain-extended with siloxane linkages as the binder are distinguished by outstanding resistance to exposure to condensed water.

Aqueous effect base lacquers which contain PU dispersions chain-extended with siloxane linkages as the sole binder are suitable for the production of multilayer lacquer coatings with improved effect development in comparison with corresponding effect lacquer coatings which may be produced using aqueous effect base lacquers containing prior art PU dispersions as the sole binder.

Production example 1

339 g of a polyester prepared from adipic acid, hexanediol and isophthalic acid (OH value 104) and 19 g of dimethylolpropionic acid are dissolved in 160 g of N-methylpyrrolidone and heated to 40° C. 125 g of isophorone diisocyanate are then added in such a manner that a reaction temperature of 80° C. is not exceeded. The reaction temperature is maintained until an NCO content of 2-(relative to solid resin),determined to DIN 53 185 is reached.

14.6 g of 3-aminopropyltriethoxysilane and 16.2 g of diethanolamine are then added in succession.

The reaction mixture is maintained at 80° C. until no free NCO groups may any longer be detected (titration). Neutralisation is achieved by adding and thoroughly incorporating a mixture of 12.6 g of triethylamine and 12.6 g of deionised water.

Once 583.4 g of completely deionised water have been added, a finely divided aqueous polyurethane dispersion is obtained.

Characteristics:

Solids 30' 1500° C.: 40.1

Acid value, solids: 15.9 mEq amine/100 g solid resin: 26.1 pH value: 7.8

Average particle size: 89 nm

Production example 2

339 g of a polyester prepared from adipic acid, hexanediol and isophthalic acid (OH value 104) and 19 g of dimethylolropionic acid are dissolved in 160 g of N-methylpyrrolidone and heated to 40° C. 125 g of isophorone diisocyanate are then added in such a manner that a reaction temperature of 80° C. is not exceeded. The reaction temperature is maintained until an NCO content of 20 (relative to solid resin) determined to DIN 53 185 is reached.

43.8 g of 3-aminopropyltriethoxysilane and 2.3 g of diethanolamine are then added in succession. The reaction mixture is maintained at 80° C. until no free NCO groups may any longer be detected (titration). Neutralisation is achieved by adding and thoroughly incorporating a mixture of 12.6 g of triethylamine and 12.6 g of deionised water.

Once 583.4 g of completely deionised water have been added, a finely divided aqueous polyurethane dispersion is obtained.

Characteristics:
Solids 30' 1500° C.: 39.6
Acid value, solids: 16.0
mEq amine/100 g solid resin: 25.4
pH value: 7.8
Average particle size: 101 nm Production example 3

339 g of a polyester prepared from adipic acid, hexanediol and isophthalic acid (OH value 104) and 19 g of dimethylolpropionic acid are dissolved in 160 g of N-methylpyrrolidone and heated to 40° C. 125 g of isophorone diisocyanate are then added in such a manner that a reaction temperature of 80° C. is not exceeded. The reaction temperature is maintained until an NCO content of 2% (relative to solid resin) determined to DIN 53 185 is reached. 42 g of 3-aminopropylmethyldiethoxysilane are then added.

The reaction mixture is maintained at 80° C. until no free NCO groups may any longer be detected (titration). Neutralisation is achieved by adding and thoroughly incorporating a mixture of 12.6 g of triethylamine and 12.6 g of deionised water. Once 583.4 g of completely deionised water have been added, a finely divided aqueous polyurethane dispersion is obtained.

Characteristics:
Solids 30' 1500° C. 40.4
Acid value, solids 16.2
mEq amine/100 g solid resin: 26.5
pH value 7.2
Average particle size: 73 nm Production example 4

339 g of a polyester prepared from adipic acid, hexanediol and isophthalic acid (OH value 104) and 19 g of dimethylolpropionic acid are dissolved in 160 g of N-methylpyrrolidone and heated to 40° C. 118.3 g of trimethylhexamethylene diisocyanate are then added in such a manner that a reaction temperature of 80° C. is not exceeded. The reaction temperature is maintained until an NCO content of 2% (relative to solid resin) determined to DIN 53 185 is reached.

33.6 g of 3-aminopropylmethyldiethoxysilane and 4.6 g of diethanolamine are then added in succession. The reaction mixture is maintained at 80° C. until no free NCO groups may any longer be detected (titration). Neutralisation is achieved by adding and thoroughly incorporating a mixture of 10.9 g of N,N-dimethylisopropanolamine and 10.9 g of deionised water. Once 585.1 g of completely deionised water have been added at 60° C., a finely divided aqueous polyurethane dispersion is obtained.

Characteristics:
Solids 30' 1500° C.: 39.6
Acid value, solids: 16.5
mEq amine/100 g solid resin: 24.9 pH value: 8.0
Average particle size: 124 nm

Production example 5

339 g of a polyester prepared from adipic acid, hexanediol and isophthalic acid (OH value 104) and 19 g of dimethylolpropionic acid are dissolved in 160 g of N-methylpyrrolidone and heated to 40° C. 125 g of isophorone diisocyanate are then added in such a manner that a reaction temperature of 80° C. is not exceeded. The reaction temperature is maintained until an NCO content of 2% (relative to solid resin) determined to DIN 53 185 is reached. 35.4 g of 3-aminopropyldimethylethoxysilane are then added.

The reaction mixture is maintained at 80° C. until no free NCO groups may any longer be detected (titration). Neutralisation is achieved by adding and thoroughly incorporating a mixture of 14.5 g of triethylamine and 14.5 g of deionised water. Once 581.5 g of completely deionised water have been added, a finely divided aqueous polyurethane dispersion is obtained.

Characteristics:
Solids 30' 1500° C.: 40.3
Acid value, solids: 16.4
mEq amine/100 g solid resin: 28.8
pH value: 8.4
Average particle size: 62 nm Production example 6

346 g of a polycaprolactone diol (OH value: 102) and 19 g of dimethylolpropionic acid are dissolved in 160 g of N-methylpyrrolidone and heated to 40° C. 138 g of 1,3-bis(1-isocyanato-1-methylethyl)benzene (TMXDI) are then added in such a manner that a reaction temperature of 100° C. is not exceeded. The reaction temperature is maintained until an NCO content of 2% (relative to solid resin) determined to DIN 53 185 is reached. 43.8 g of 3-aminopropyltriethoxy-silane and 2.3 g of diethanolamine are then added in succession.

The reaction mixture is maintained at 80° C. until no free NCO groups may any longer be detected (titration). Neutralisation is achieved by adding and thoroughly incorporating a mixture of 12.6 g of triethylamine and 12.6 g of deionised water.

Once 609.4 g of completely deionised water have been added, a finely divided aqueous polyurethane dispersion is obtained.

Characteristics:
Solids 30' 1500° C.: 39.8
Acid value, solids: 15.2
mEq amine/100 g solid resin: 23.4
pH value: 7.1
Average particle size: 112 nm Production example 7 a) Production of a carboxy-functional polymer containing epoxide groups:

100 g of an anhydride mixture (acid value/H$_2$O=486) produced by reacting trimellitic anhydride with 1,2-propanediol, thus consisting of trimellitic anhydride and anhydrides of the following formulae

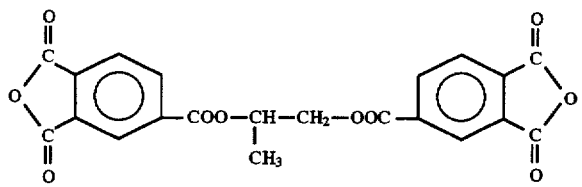

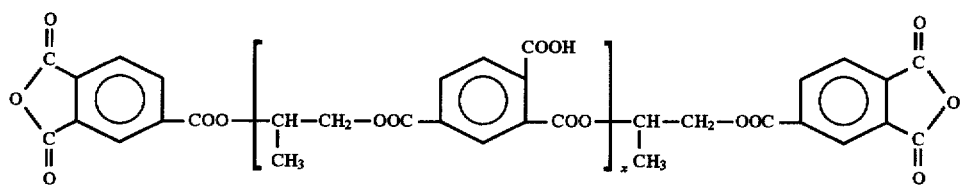

x=1 to 8 which had been homogenised in 108 g of xylene at 50° C., were added dropwise within 1 hour to a solution of 141 g of a polyester (OH value=88), produced on the basis of phthalic anhydride, isophthalic acid, maleic anhydride and glycerol as described in DE-OS 28 11 913 in 70 g of methyl ethyl ketone. The mixture was stirred at 90° C. until the reaction mixture had reached an acid value in water of 165 (100% resin). 12 g of water were then mixed in and, after 6 hours' stirring at 80° to 90° C., an acid value in butanol of 168 (100% resin) was reached. The temperature of the mixture was reduced to 60° C. and, once 0.3 g of lithium benzoate had been added, 132 g of an epoxidised linseed oil (epoxide value=8.7) were added dropwise within 2 hours and the mixture stirred until the acid value in butanol had fallen to 86.5. A mixture of 42 g of dimethylamine (60% in water) in 860 g of water was then stirred in. A light yellow, opalescent solution was obtained, from which the organic solvent was removed by distillation at 0.1 bar and 40° C. After filtration, a yellowish, virtually clear aqueous resin solution was obtained. Solids content: 320 (1 hour at 125° C.).

b) Production of the polymer dispersion 705 g of the above aqueous (32%) dispersion and 196 g of water were placed in a reactor equipped with a stirrer, reflux condenser, internal thermometer and feed device for the monomers and initiator. This mixture was heated to 80° C. while being stirred and a solution of 0.5 g of ammonium peroxydisulphate in 35 g of water added. 5 minutes after addition of the initiator, 35 g of a monomer mixture prepared from 125 g of methyl methacrylate, 94 g of n-butyl acrylate and 17 g of glycidyl methacrylate were added and, after a further 15 minutes' prepolymerisation, the remaining quantity of monomer was apportioned over 2 hours. 10 minutes after completion of addition, a further 0.2 g of ammonium peroxydisulphate dissolved in 10 g of water were added within 10 minutes and the batch stirred for a further 2 hours at 80° C. in order to ensure complete conversion. A stable aqueous dispersion with a solids content of approximately 40% was obtained.

Production example 8 a) Production of a carboxy-functional polymer containing epoxide groups:

100 g of anhydride mixture (acid value/H₂O=560) produced by reacting trimellitic anhydride with 1,2-propanediol, which had been homogenised in 30 g of acetone at 50° C., were added dropwise within 1 hour to a solution of 127 g of a polyester (OH value=107) in 70 g of methyl ethyl ketone. The mixture was stirred at 90° C. until the reaction mixture had reached an acid value in water of 197 (relative to 100% resin). A further 15 g of water were then mixed in. After 6 hours' stirring at 80° to 90° C., the acid value in butanol was 180 (100% resin). The temperature of the mixture was reduced to 60° C. and 133 g of an epoxidised linseed oil (epoxy value=8.9) were added dropwise within 2 hours.

The mixture was stirred until the acid value in butanol had fallen to 90. A mixture of 56 g of dimethylaminoethanol in 540 g of water was then stirred in. A light yellow, opalescent solution was obtained, from which the organic solvent was removed by distillation at 0.1 bar and 40° C. After filtration, a yellowish, virtually clear aqueous resin solution was obtained. Solids content (1 h at 125° C.) approximately 39%.

b) Production of the polymer dispersion 355 g of the (39%) aqueous dispersion from 1a) were mixed with 452 g of water in a reactor equipped with a stirrer, reflux condenser, internal thermometer and feed device for the monomers and initiator, the mixture was heated to 80° C. while being stirred and a solution of 0.5 g of ammonium peroxydisulphate in 35 g of water added. 5 minutes after addition of the initiator, 35 g of a monomer mixture prepared from 165 g of methyl methacrylate, 142 g of n-butyl acrylate and 24 g of hydroxyethyl acrylate were added and, after a further 15 minutes' prepolymerisation, the remaining quantity of the monomers apportioned over 2 hours. 10 minutes after completion of addition, a further 0.2 g of ammonium peroxydisulphate dissolved in 10 g of water were added within 10 minutes and the batch stirred for a further 2 hours at 80° C. in order to ensure complete conversion. A stable aqueous dispersion with a solids content of approximately 40% was obtained.

Production example 9

Production of a paste resin

In a reaction vessel with an internal thermometer and reflux condenser, 1395 g of a linear saturated polyester (synthesised from adipic acid and hydroxypivalic acid neopentyl glycol ester) with an OH value of 112 and a viscosity (at 25° C.) of 8.7 Pa·s are thoroughly stirred with 161 g of dimethylolpropionic acid and 163 g of trimethylolpropane and dissolved with heating to 90° C. and then cooled to 50° C. Once 865 g of tetramethylxylylene diisocyanate have been added, the mixture is slowly heated to 1200° C. until the NCO content is below 0.2%. The mixture is then diluted with 861 g of methoxypropanol.

| Solids content (30 min 150° C.) | 75 wt. % |
|---|---|
| Acid value (relative to solids) | 27 |
| Viscosity at 25° C., diluted with | 210 mPa.s* |

A mixture prepared from 58.3 g of dimethylethanolamine and 58.3 g of water is rapidly added to 1963 g of this resin solution and heated to 80° C. The mixture is then diluted with water to yield a turbid, highly viscous paste which may readily be worked when hot with the following characteristics:

| | |
|---|---|
| Solids content (30 min 150° C.) | 32.3 wt. % |
| Viscosity at 25° C. | 1.3 Pa.s* |
| mEq value | 42 |
| pH value | 7.6 |

*measured in a rotational viscosimeter with a coaxial cylinder arrangement to DIN 53 018 and 53 019 after 5 minutes' shearing at a shear gradient of 231 sec$^{-1}$.

Production of the components for the following lacquer examples

Production example 10

Production of a binder solution 50.00 g of the water-borne binder described above in example 7 are mixed with

| | |
|---|---|
| 43.94 g | of completely deionised water and |
| 6.00 g | of butoxyethanol and adjusted to a pH value of 6.2–6.4 with |
| 0.06 g | of N-dimethylaminoethanol |

Production example 11

Production of an aluminium paste composition 20.50 g of a conventional commercial aluminium paste with a metal content of 65% are thoroughly stirred with a mixture of

| | |
|---|---|
| 7.00 g | of butoxyethanol and |
| 15.50 g | of completely deionised water and then combined with a mixture prepared from |
| 4.00 g | of the binder described above in production example 7 and additionally |
| 4.50 g | of the binder described in production example 2, |
| 10.00 g | of butoxyethanol, |
| 34.70 g | of completely deionised water and |
| 3.00 g | of a conventional commercial acidic acrylate thickener. The pH value is adjusted to 6.2–6.4 with a mixture prepared from |
| 0.08 g | of N-dimethylaminoethanol and |
| 0.72 g | of completely deionised water. |

Production example 12

Production of a ground blue pigment preparation Using a dissolver,

| | |
|---|---|
| 10.00 g | of Cu phthalocyanine pigment are predispersed in |
| 17.00 g | of a conventional hexamethoxymelamine resin and |
| 10.00 g | of butoxyethanol and, after adding a further |
| 5.00 g | of the melamine resin and |
| 10.00 g | of butoxyethanol, fully dispersed with a bead mill. This is then combined with a mixture prepared from |
| 0.90 g | of a conventional commercial acidic acrylate thickener and |
| 18.91 g | of completely deionised water and adjusted to a pH of 7.1–7.3 with |
| 2.00 g | of N-dimethylaminoethanol and |
| 26.19 g | of completely deionised water. |

Production example 13

Production of a ground green pigment preparation

| | |
|---|---|
| 20.00 g | of a chlorinated phthalocyanine pigment are predispersed with a dissolver into a mixture prepared from |
| 20.00 g | of the binder described above in production example 9, |
| 35.00 g | of butoxyethanol and |
| 0.50 g | of N-dimethylaminoethanol and then completely dispersed in a bead mill. The mixture is then diluted with |
| 24.50 g | of completely deionised water. |

Production example 14

The same method was used as described in production example 10, but using the binder described in production example 8 (50.00 g).

Production example 15

The same method was used as described in production example 11, but using the binder described in production example 8 (4.00 g), together with the binder described in production example 2 (4.50 g).

Examples of lacquer formulations

EXAMPLE 1

1.1 Production of a blue, water-borne metallic base lacquer

| | |
|---|---|
| 30.00 g | of the binder solution described in production example 10 are stirred together for a period of 30 minutes with |
| 19.00 g | of the aluminium paste composition described in production example 11, |
| 1.90 g | of acidic acrylate thickener (as used above), |
| 17.44 g | of completely deionised water and |
| 0.25 g | of N-dimethylaminoethanol. |
| 25.50 g | of the polyurethane dispersion described in production example 6 are stirred into this mixture and a quantity of |
| 0.94 g | of the ground pigment preparation described in production example 12 are added. |
| 4.00 g | of n-butanol are then stirred in and the viscosity is adjusted to 90–95 mPa.s at a shear gradient of 100 sec$^{-1}$ with |
| 0.96 g | of water. |

Solids content: 18.0.wt. % (120 minutes in a circulating air oven at 120° C.).

1.2 Application of the base lacquer and a clear lacquer

The base lacquer described in 1.1 %s sprayed with an air-atomising gun onto a metal sheet pretreated in the conventional manner by Zn phosphating, electrocoating lacquer and sprayed primer in such a manner that a total dry film thickness of 15 μm is achieved in two coats. The conditions during application of the base lacquer are an ambient temperature of 23° C. and a relative humidity of 60%. After application, the coated sheet is rapidly dried for 5 minutes at 50° C. in a circulating air oven and, once cooled to 23° C., is overcoated in a conventional manner with a conventional commercial acrylic/melamine resin clear lacquer and stoved for 30 minutes at 130° C.

An even, cloud-free coating with excellent metallic effect, very high gloss and outstanding resistance to condensed water is obtained in this manner.

EXAMPLE 2

2.1 Production of a silver coloured, water-borne metallic base lacquer

In a similar manner to example 1.1, a silver coloured base lacquer is produced from

| | |
|---|---|
| 40.00 g | of the binder solution described in production example 14, |
| 19.00 g | of the aluminium paste composition described in production example 15, |
| 1.90 g | of acidic acrylate thickener, |
| 0.26 g | of N-dimethylaminoethanol, |
| 22.0 g | of polyurethane dispersion (according to production example 2), |
| 4.00 g | of n-butanol and |
| 12.84 g | of completely deionised water. |

The solids content is 18.0 wt. % (120 minutes in a circulating air oven at 120° C.). Viscosity is 90–95 mPa·s at a shear gradient of 100 sec$^{-1}$.

2.2 Application of the base lacquer and a clear lacquer

As described in example 1.2, a pretreated sheet of metal is coated with base lacquer and rapidly dried for 5 minutes at 50° C. After cooling, the sheet is overcoated with a conventional commercial two component acrylic/isocyanate clear lacquer and stoved for 30 minutes at 130° C.

The coating obtained in this manner is distinguished by elevated brilliance, absolutely even cloud-free effect formation, a pronounced metallic effect and outstanding resistance to condensed water.

EXAMPLE 3

3.1 Production of a green water-borne metallic base lacquer

The base lacquer is produced in a similar manner to example 1.1 from

| | |
|---|---|
| 59.00 g | of binder solution according to production example 10 |
| 18.50 g | of aluminium paste composition according to production example 11 |
| 1.90 g | of acidic acrylate thickener, |
| 0.26 g | of N-dimethylaminoethanol, |
| 4.80 g | of polyurethane dispersion according to production example 4 |
| 0.60 g | of the green ground pigment preparation described in production example 13, |
| 4.00 g | of n-butanol and |
| 10.94 g | of completely deionised water. |

Solids content: 17.1 wt. % (120 minutes in a circulating air oven at 120° C.),

Viscosity: 90–95 mPa·s at a shear gradient of 100 sec$^{-1}$.

3.2 Application of the base lacquer and a clear lacquer

As described in example 1.2, the base lacquer from 3.1 is applied onto a pretreated sheet of metal and, after rapid drying, overcoated with a conventional commercial acrylic/melamine clear lacquer and stoved for 30 minutes at 130° C. Green metallic coating is obtained with an equally good range of properties as in examples 1.2 and 2.2.

EXAMPLE 4

4.1 Production of a plain coloured red base lacquer 300 g of a conventional paste resin (according to the example of DE-OS 4 000 889) are mixed with 350 g of a conventional commercial vat pigment (Colour Index red 168). The pH is adjusted to 8.5 with dimethylethanolamine and the solids content to 50 wt. % by adding deionised water. The mixture is then fully dispersed in a bead mill until transparent. 4.2

1.4 g of a conventional polyacrylic acid based thickener (solids content: 10 wt. %, pH 7.5) are mixed with 129 g of the dispersion from example 1 and 40 g of the paste resin from example 4.1. 24 g of a conventional commercial non water-soluble melamine resin (Setamine US 138/BB 70 from Akzo) are then stirred in 10 g of the red paste from example 4.1 were then added and homogeneously stirred in. An application viscosity of 100–130 mpals, determined by rotational viscosimetry at a shear gradient of 231 sec$^{-1}$ and 25° C., is then established with deionised water.

4.3 Application of the base lacquer and a clear lacquer

The aqueous base lacquer obtained is sprayed onto conventional phosphated bodywork sheet already provided with a cathodic electrocoating and surfacer coat. The coating is applied to a dry film thickness of 30 μm. After application, the coating is flashed off for 10 minutes at room temperature and then predried for 10 minutes at 80° C. A conventional commercial, melamine resin curing automotive original clear lacquer based on acrylate resin is then overcoated to a dry film thickness of 35 μm and dried for 18 minutes at 120° C. (object temperature).

A multilayer lacquer coating with outstanding resistance to condensed water (DIN 50 017, 240 hours, 40° C.) is obtained.

EXAMPLE 5

Production of a silver metallic two-layer lacquer coating 20 g of a conventional commercial aluminium paste suitable for aqueous base lacquer containing 65 wt. % of aluminium are mixed with 20 g of ethylene glycol monobutyl ether, 6 g of N-methylpyrrolidone and 1 g of a conventional commercial wetting agent to yield a bronze slurry. 1.4 g of a conventional commercial polyacrylic acid based thickener are then mixed in (solids content: 10 wt. %, pH 7.5). 129 g of the dispersion from example 1 and 40 g of the paste resin from example 4.1 are then stirred into the bronze slurry.

24 g of a conventional commercial non water-soluble melamine resin (Setamine US 138/BB 70 from Akzo) are then stirred in. An application viscosity of 100–130 mPa·s, determined by rotational viscosimetry at a shear gradient of 231 sec$^{-1}$ and 25° C., is then established with deionised water.

The aqueous base lacquer obtained is sprayed onto conventional phosphated bodywork sheet already provided with a cathodic electrocoating and surfacer coat. The coating is applied to a dry film thickness of 15 μm. After application, the coating is flashed off for 10 minutes at room temperature and then predried for 10 minutes at 80° C. A conventional commercial, melamine resin curing automotive original clear lacquer based on acrylate resin is then overcoated to a dry film thickness of 35 μm and dried for 18 minutes at 120° C. (object temperature).

A multilayer lacquer coating with absolutely even cloud-free effect formation, a pronounced metallic effect and outstanding resistance to condensed water is obtained.

We claim:

1. An aqueous dispersion of one or more polyurethane resins wherein the polyurethane resin:
   (a) has a number average molecular weight (Mn) of 2,500 to 1,000,000,
   (b) contains siloxane linkages,
   (c) contains water dispersing moieties selected from the group consisting of ionic groups, groups convertible into ionic groups hydrophilic groups and any combination thereof,
   (d) has no hydroxysilyl, alkoxysilyl or alkanoyloxysilyl groups in an amount sufficient to cause cross-linking;
   (e) has essentially no isocyanate groups subsequent to formation of the siloxane linkages or groups derived from isocyanate groups; and, (f) is linear or branched, and ungelled but chain extended by the siloxane linkages;

the siloxane linkages being present at a content of 2 to 150 mmol of siloxane linkages per 100 g of solid resin, and the water dispersing moieties being present at a content of 5 to 200 mEq per 100 g of solid resin.

2. An aqueous dispersion according to claim 1, produced by a process comprising:

obtaining the aqueous dispersion by adding to a mixture of organic solvent and polyurethane prepolymer containing water dispersing moieties and containing at least one group R'OSi—, in which R'=$C_1$ to $C_8$ alkyl or C(O)R''' and R'''=$C_1$–$C_{10}$ alkyl, an at least stoichiometric quantity of water to hydrolyze the SiOR' groups, to chain extend the polyurethane prepolymer and produce a final polyurethane resin;

converting the final polyurethane resin into an aqueous dispersion with the addition of a large excess of water after chain extension and removing any solvent present.

3. A process for the production of an aqueous dispersion of one or more polyurethane resins, comprising:

adding an at least stoichiometric quantity of water to a mixture of organic solvent and at least one polyurethane prepolymer containing water dispersing moieties selected from the group consisting of ionic groups, groups capable of ion formation, hydrophilic groups and any combination thereof, and containing at least one group R'OSi—, in which R'=$C_1$ to $C_8$ alkyl or C(O)R''' and R'''=$C_1$–$C_{10}$ alkyl to hydrolyze the SiOR' groups, chain extend the polyurethane prepolymer and produce a final polyurethane resin;

converting the final polyurethane resin after chain extension into an aqueous dispersion by adding an excess of water and removing any solvent present; wherein the proportions of the individual educts are selected in such a manner that the final polyurethane resin;

(a) has an average molecular weight of 2,500 to 1,000,000, (b) contains siloxane linkages, (c) contains the water dispersing moieties, (d) has no hydroxysilyl, alkoxysilyl or alkanoyloxysilyl groups in an amount sufficient to cause cross-linking, (e) has essentially no isocyanate groups; and (f) is linear or branched, is ungelled but chain extended by the siloxane linkages; and wherein the siloxane linkages are present at a content of 2 to 150 mmol per 100 g of solid resin, and the water dispersing moieties are present at a content of 5 to 200 mEq per 100 g of solid resin.

4. A process according to claim 3, comprising reacting in an organic solvent a linear or branched, ungelled, isocyanate-functional polyurethane prepolymer containing water dispersing moieties one and more compounds of the formula

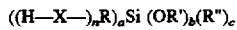

with X=O, S, NH or NR''',

R=a difunctional, trifunctional or tetrafunctional organic residue with a molecular weight of 13 to 500, R'=$c_1$ to $C_8$ alkyl or C(O)R''', R''=R'''=$C_1$ to $C_{10}$ alkyl, R''''=$C_1$ to $C_8$ alkyl, a=1, 2 or 3, b=1, 2 or 3, c=0, 1 or 2, n=1 to 3, wherein two or more residues R', R'' and R''' may be identical or different and in which the sum of a plus b plus c is four, to yield the polyurethane polymer having at least one R'OSi group.

5. A process according to claim 4, comprising reacting in an anhydrous environment a) at least one linear or branched compound, which bears at least two isocyanate-reactive groups with an average molecular weight of 60 to 10000, b) at least one organic polyisocyanate, and c) at least one compound with more than one isocyanate-reactive group and at least one water dispersing moiety with a number average molecular weight (Mn) of up to 10000, in an NCO/OH ratio of above 1 to 4:1 to produce the isocyanate functional polyurethane.

6. A process according to claim 5, wherein the component a) linear or branched compound is at least one polyol based on one or more polyethers, polyesters and/or polycarbonates having at least 2 OH groups per molecule and a number average molecular weight (Mn) of 60 to 10000.

7. An aqueous coating composition containing an aqueous polyurethane resin dispersion according to claim 1 with one or more conventional lacquer additives.

8. A coating composition according to claim 7, which contains one or more formaldehyde condensation resins and/or blocked polyisocyanates as crosslinking agents.

9. A coating composition according to claim 7 which additionally contains one or more further binders in a quantity of up to 50 wt. %, relative to the sum of solids contents by weight of all binders and crosslinking agents.

10. A base lacquer suitable for use in multilayer lacquer coatings prepared from an aqueous coating composition according to claim 7.

11. A method for lacquer coating of industrial articles, motor vehicles and the components thereof, comprising applying an aqueous coating composition according to claim 7 to the industrial article, motor vehicle or component thereof.

12. An aqueous dispersion according to claim 1 wherein the polyurethane resin further contains hydroxyl groups at a content providing a hydroxyl value of up to about 100 mg KOH per g of solid resin.

13. A process according to claim 3 wherein the polyurethane prepolymer further contains hydroxyl groups, and the final polyurethane resin contains hydroxyl groups at a content providing a hydroxyl value of up to about 100 mg KOH per g of solid resin.

14. A process according to claim 4 wherein the isocyanate functional polyurethane prepolymer is also reacted with one or more alkanolamines bearing $NH_2$ or NH groups or a mixture thereof, and with an OH functionality of at least 1.

15. An aqueous dispersion according to claim 12 wherein the hydroxyl value is above 1.

16. An aqueous dispersion according to claim 12 wherein the hydroxyl value is within a range of about 1 to about 60.

17. An aqueous dispersion according to claim 1 wherein the water dispersing moiety is acidic.

18. An aqueous dispersion according to claim 17 wherein the acidic water dispersing moiety is neutralized.

19. An aqueous dispersion according to claim 17 wherein the content is from about 15 to about 100 mg per 100 g of resin.

* * * * *

UNITED STATES PATENT AND TRADEMARK OFFICE
CERTIFICATE OF CORRECTION

PATENT NO. : 5,760,123

DATED : JUNE 2, 1998

INVENTOR(S) : VOGT-BIRNBRICH ET AL.

It is certified that error appears in the above-identified patent and that said Letters Patent is hereby corrected as shown below:

| | |
|---|---|
| In column 8, line 58: | Insert space after "70". |
| In column 9, line 56: | Insert —.— after "hydrogen". |
| In column 10, lines 4–6: | For all occurrences, "7" should read —ϒ—. |
| In column 10, lines 7–8: | For all occurrences, "6" should read —δ—. |
| In column 11, line 15: | "950°" should read —95°—. |
| In column 15, line 28: | "9" should read —β—. |
| In column 16, line 48: | "PuJ" should read —PU—. |
| In column 17, line 9: | "10to" should read —10 to—. |
| In column 18, line 40: | "2–(relative" should read —2% (relative—. |
| In column 18, line 53: | "1500" should read —150°—. |
| In column 18, lines 60–61: | "dimethylolropionic" should read —dimethylolpropionic—. |
| In column 18, line 65: | "20" should read —2%—. |
| In column 19, line 9: | "1500°" should read —150°—. |
| In column 19, line 32: | "1500°" should read —150°—. |
| In column 19, line 40: | Delete "20". |
| In column 19, line 49: | Delete "30". |

UNITED STATES PATENT AND TRADEMARK OFFICE
CERTIFICATE OF CORRECTION

PATENT NO. : 5,760,123

DATED : JUNE 2, 1998

INVENTOR(S) : VOGT-BIRNBRICH ET AL.

It is certified that error appears in the above-identified patent and that said Letters Patent is hereby corrected as shown below:

| | |
|---|---|
| In column 19, line 54: | Delete "35". |
| In column 19, line 57: | "1500°" should read —150°—. |
| In column 20, line 21: | "1500°" should read —150°—. |
| In column 20, line 47: | "1500°" should read —150°—. |
| In column 21, line 38: | "320" should read —32%—. |
| In column 22, line 32: | "1a)" should read —1a)—. |
| In column 22, line 60: | "1200°" should read —120°—. |
| In column 24, line 50: | "%s" should read —is—. |
| In column 25, line 64: | Move "4.2" to the beginning of line 65. |
| In column 26, line 5: | "mpals" should read —mPa.s—. |

UNITED STATES PATENT AND TRADEMARK OFFICE
CERTIFICATE OF CORRECTION

PATENT NO. : 5,760,123

DATED : JUNE 2, 1998

INVENTOR(S) : VOGT-BIRNBRICH ET AL.

It is certified that error appears in the above-identified patent and that said Letters Patent is hereby corrected as shown below:

In column 28, line 23 (claim 6): "60" should read —600—.

In column 28, line 63 (claim 19): "17" should read —18—.

Signed and Sealed this

Sixth Day of April, 1999

*Attest:*

Q. TODD DICKINSON

*Attesting Officer*   *Acting Commissioner of Patents and Trademarks*